US008335678B2

(12) United States Patent
Hughes et al.

(10) Patent No.: US 8,335,678 B2

(45) Date of Patent: Dec. 18, 2012

(54) NETWORK STIMULATION ENGINE

(75) Inventors: Chad O. Hughes, West Richland, WA (US); Steven M. Silva, Kennewick, WA (US)

(73) Assignee: ZanttZ, Inc., Portola Valley, CA (US)

(*) Notice: Subject to any disclaimer, the term of this patent is extended or adjusted under 35 U.S.C. 154(b) by 0 days.

(21) Appl. No.: 13/495,589

(22) Filed: Jun. 13, 2012

(65) Prior Publication Data

US 2012/0253779 A1 Oct. 4, 2012

Related U.S. Application Data

(63) Continuation of application No. 13/327,150, filed on Dec. 15, 2011.

(60) Provisional application No. 61/423,528, filed on Dec. 15, 2010.

(51) Int. Cl.
*G06F 9/44* (2006.01)
*G06F 7/04* (2006.01)
*G06F 15/16* (2006.01)

(52) U.S. Cl. .................... 703/21; 703/22; 726/2; 726/3; 726/4

(58) Field of Classification Search .................... 703/21, 703/22; 726/2, 3, 4
See application file for complete search history.

(56) References Cited

U.S. PATENT DOCUMENTS 7,552,480 B1 * 6/2009 Voss ................................ 726/25
7,716,720 B1 * 5/2010 Marek et al. ...................... 726/2
2002/0157020 A1 10/2002 Royer
2003/0028803 A1 * 2/2003 Bunker et al. ................ 713/201
2005/0166072 A1 7/2005 Converse et al.
2006/0109793 A1 5/2006 Kim et al.
2008/0005782 A1 * 1/2008 Aziz ................................ 726/3
2009/0320137 A1 12/2009 White et al.
2012/0158395 A1 * 6/2012 Hughes et al. .................. 703/21

OTHER PUBLICATIONS

McKeown, Nick et al., "OpenFlow: Enabling Innovation in Campus Networks," ACM SIGCOMM Computer Communication Review, Apr. 2008 (may be Mar. 14, 2008 as marked on front page), pp. 69-74, vol. 38, Issue 2, ACM, New York, NY.

International Search Report and Written Opinion, mailed Jul. 31, 2012, for International Application No. PCT/US2011/065283; 9 pages.

* cited by examiner

*Primary Examiner* — Omar Fernandez Rivas
*Assistant Examiner* — Nithya Janakiraman
(74) *Attorney, Agent, or Firm* — Kilpatrick Townsend & Stockton LLP; Mark P. Mathison

(57) ABSTRACT

Methods, devices, and systems are disclosed for simulating a large, realistic computer network. Virtual actors statistically emulate the behaviors of humans using networked devices or responses and automatic functions of networked equipment, and their stochastic actions are queued in buffer pools by a behavioral engine. An abstract machine engine creates the minimal interfaces needed for each actor, and the interfaces then communicate persistently over a network with each other and real and virtual network resources to form realistic network traffic. The network can respond to outside stimuli, such as a network mapping application, by responding with false views of the network in order to spoof hackers, and the actors can respond by altering a software defined network upon which they operate.

20 Claims, 9 Drawing Sheets

Range

NETWORK STIMULATION ENGINE

CROSS-REFERENCES TO RELATED APPLICATIONS

This application is a continuation of U.S. application Ser. No. 13/327,150, filed Dec. 15, 2011, which claims the benefit of U.S. Provisional Application No. 61/423,528, filed Dec. 15, 2010. These applications are hereby incorporated by reference in their entireties for all purposes.

STATEMENT AS TO RIGHTS TO INVENTIONS MADE UNDER FEDERALLY SPONSORED RESEARCH OR DEVELOPMENT

NOT APPLICABLE

BACKGROUND

1. Field of the Invention

The present application generally relates to computer networking, and, more specifically, to simulating a live, complex, multi-node computer network environment.

2. Description of the Related Art

Computer networks have grown in size and sophistication. Businesses, governments, and other organizations have seen their computer networks expand to enable internal communication among employees' computers as well as with customers/clients, vendors and suppliers, the general public, and others outside the organizations through the Internet.

Network traffic on such networks has expanded commensurately. Network traffic, such as that from employees checking email from web servers, accessing databases and file servers, printing to print servers or printers, or surfing the World Wide Web, typically consists of packets racing around an Internet Protocol (IP) network. Some of the typical network traffic is initiated by human users when they actively go onto the network. The traffic ebbs and flows as the business day goes on. Some of the typical network traffic is initiated by automatic processes that are not a result of immediate human interaction. For example, email software in a user's personal computer (PC) workstation may automatically send a request to an email server to check every five minutes for new email. As another example, a backup file server may initiate archiving at 2:00 am each work day. This traffic comes and goes in response to schedule times.

As the enablers of such networks, such as routers, switches, bridges, hubs, and repeaters, become cheaper and more sophisticated, networks have been able to expand to facilitate connections not only between many more homogeneous computer workstations and servers than was possible in the past but also different types of networked devices. At the same time, powerful smart phones, Personal Digital Assistants (PDAs), tablet computers, and other portable electronic devices that can wirelessly (or through cables) connect to computer networks have exploded in popularity. Businesses are purchasing more Voice over Internet Protocol (VoIP) phones, multi-function scanner/fax/copy machines, and other networked appliances as they become more reliable and easier to use. These machines are being connected to the businesses' networks.

The resulting scale in the number of connected devices and disparate mix of such automated and human-operated devices makes for networks with complex traffic patterns. A real, live network is so complex that it is essentially non-deterministic.

Recently, governments have become interested in testing devices and people on large, realistic networks that are cordoned off from real networks. For example, the Defense Advanced Research Projects Agency (DARPA) is developing a National Cyber Range to provide realistic, quantifiable assessments of the U.S.'s cyber research and development technologies. The National Cyber Range can be used to test software, hardware, and humans in a realistic setting for defending against cyber attack. Besides testing vulnerabilities, presumably it can also be used to test offensive cyber weapons and battle damage assessment tools. To create the large networks, designers have procured millions of dollars worth of computer hardware.

By connecting a large number of servers, workstations, and other networked equipment and devices together, a realistic environment can be produced. However, because computer equipment becomes obsolete quickly, the equipment must be refreshed every couple of years in order to stay relevant to the latest threats.

There is a need in the art for less expensive cyber ranges that can emulate a large number of different and disparate computers and other networked devices for blue team/red team training and other needs. There is also a need for better defenses against hackers.

BRIEF SUMMARY

The present application is generally directed to methods, devices, and systems for a large, realistic computer network simulation software tool that stimulates a network like a real network. In one embodiment, a Network Stimulation Engine is software that generates and stimulates a simulated network environment populated with actors and actions based on user-designed scenarios. It persistently ties together these actors, actions, and the simulated network throughout the duration of the scenario, providing realistic and consistent simulated network traffic.

Embodiments of the present invention are related to a method of simulating a computer network. The method includes receiving from a user a user-defined model for a plurality of online actors, each actor simulating a piece of networked equipment or a human operating a networked device, the received model defining for each actor at least one action and corresponding probability for each action that the action will occur and a number of times that the action will occur in a given unit time, determining, using at least one processor operatively coupled with a memory, a planned schedule of actions associated with each actor based on the corresponding probabilities using a statistical engine, establishing a unique media access control (MAC) address for each actor, reserving an Internet protocol (IP) address for each actor, and sending network traffic on a computer network for each action based on the planned schedule, the network traffic for each action attributed to the associated actor through the MAC and IP addresses, thereby simulating the pieces of networked equipment and human-operated networked devices on the computer network.

Some embodiments are related to a method of projecting a false apparent computer network view for protecting a real computer network. The method includes providing a physical computer network, the physical computer network having an actual, physical configuration, receiving from a configuration file a definition of a first false apparent view of a network configuration, receiving from the configuration file a definition of a second false apparent view of a network configuration, the first and second false apparent views being different from one another, the first and second false apparent views of network configurations being different from the actual, physical configuration of the physical computer network, receiving into the physical computer network a request from a network mapping tool executed by a user for an identification of a number of nodes and an Internet protocol (IP) address of each of the nodes in the computer network, determining that the user should view a false view of the physical configuration, the determining based on a network location of the user, selecting between the first or second false apparent view based on an association of the request with a network mapping tool, the selecting based on the determination that the user should view a false view of the physical configuration, building a response to the request based on the selected first or second false apparent view, the response including a false number of nodes and at least one false IP address of each of the nodes in accordance with the selected first or second false apparent view, and sending the built response to the network mapping tool.

The method can also include receiving into the physical computer network a second request from the network mapping tool for a type of traffic sent between two or more of the nodes, building a second response to the second request based on the selected first or second false apparent view, the second response including a false type of traffic sent between two or more of the nodes, and sending the built second response to the network mapping tool.

Other embodiments relate to machine-readable tangible storage media and computer systems that employ or store instructions for the methods described above.

A further understanding of the nature and the advantages of the embodiments disclosed and suggested herein may be realized by reference to the remaining portions of the specification and the attached drawings.

DETAILED DESCRIPTION

Figure 1:
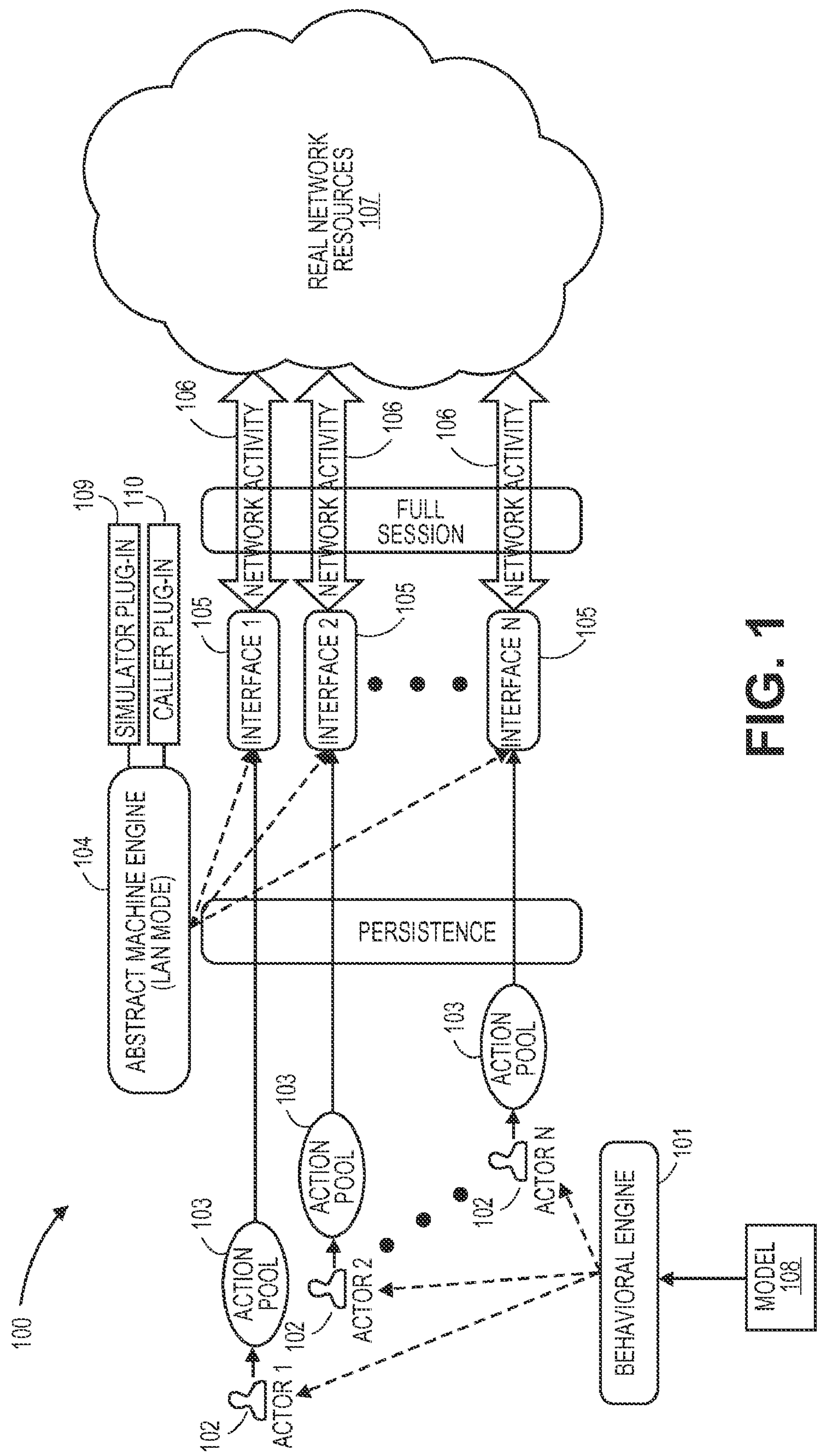
FIG. 1 illustrates a behavioral engine and abstract machine engine in accordance with an embodiment.

A large, realistic computer network can be simulated using a behavioral engine and an abstract machine engine. The behavioral engine produces "actors," which simulate real pieces of networked equipment and/or humans operating their networked devices. The actors are persistent and stay operating per their schedule until turned off by a human operator. The abstract machine engine establishes within a relatively small set of computers the minimal virtual networking interfaces needed for the simulated actors. The minimal virtual networking interface for each actor may consist of only a unique Media Access Control (MAC) address and Internet Protocol (IP) address in some cases. The interfaces communicate with one another and with real equipment on the network based on the behavioral models. The number of actors can be scaled up considerably because they do not require their own dedicated pieces of hardware from which to run.

At least one difference between abstract machines and virtual machines is that abstract machines perform specific tasks that appear as if they were produced by a machine with an operating system.

In one embodiment, the behavior engine inputs empirically-derived behaviors of online humans and network equipment from a file, database, or other storage location from a model. The model can be created and modified by a user in order to customize its characteristics.

The model may partition an average network user's characteristics into hour-by-hour behaviors. For example, from 8:00 am to 9:00 am, an employee in a billing department may send out an average of five emails, use instant messaging to communicate with a shipping department 20 times, pull up 15 web pages, etc. From 9:00 am to 10:00 am, the same employee may only send out an average of two emails to the shipping department, send 5 instant messages, pull up 3 web pages, and use a Voice over Internet Protocol (VoIP) phone for an average of 30 minutes. Each of the average values may have standard deviations/variations and other statistical information associated therewith. Other hours, including lunch time and the evening time, can be modeled as needed by the simulation. Monday through Friday can be modeled as well as the weekends and workdays that are near holidays. Days can be subdivided by hours, blocks of hours, minutes, seconds, etc.

State-based models can be employed as well. An employee may be modeled as having different states, such as 'entering work,' 'busy on a project,' or 'breaking for lunch.'

Frequency methods can also be employed. For example, an employee may be modeled as checking his email 15 times per day.

The behavioral engine 'randomizes' the resulting network traffic per the empirical data in the model so that each action does not occur at precisely the same time every day. The behavioral engine produces a set of online actors, each with its own timeline or schedule of events. As a result, each actor simulates a human operating a networked device or a non-human operated piece of networked equipment.

The abstract machine engine determines the minimum network interfaces required for the various actors. In many cases, a MAC address and IP address are all that are needed. A small footprint interface that uses little memory and resources can be much simpler than an entire virtual machine or emulator. Because of the small footprint, the number of actors and resulting interfaces can be scaled to include dozens, hundreds, thousands, or more actors on a network.

The resulting simulated network can be used for a variety of purposes, including spoofing would-be hackers, training system administrators, and testing network hardware and software. A user with network mapping software—which pings to find resources—'sees' the plethora of virtual interfaces that were created by the abstract machine engine. A packet sniffer 'sees' traffic on the simulated computer network just like it would see traffic on a real network. The simulated network is virtually indistinguishable from a real network.

Host-Based Network Hypervisor

It is possible to proactively create a multitude of apparent networks by abstracting and organizing the resources of one or many hosts via a host abstraction layer (analogous to a hardware abstraction layer in a physical host operating system) in order to project abstract machines in various layers of an apparent network. This host abstraction layer may also be termed a "host-based network hypervisor."

A host-based network "hypervisor" mechanism can be created through a process of host resource extraction. An operator of a network, such as an administrator, user, hacker, etc., does not observe the actual, physical constructed network, such as physical switches, hosts, and cabling, but rather an apparent network that is perceived based on observations and interactions as they perform various network operations. What network operators observe may not necessarily be the actual switching and host fabric topology, but the apparent network based on the operators' unique points of presence in that network and the operations that are being performed at a given time. Furthermore, while there may only be one actual topology of switches and hosts, there can be a multitude of apparent networks depending on how users observe and utilize that actual network.

For the hypervisor, an agent containing three distinct software programs can be installed as services/daemons into various layers of a host operating system. The purpose of each agent can be to manage the host's resources, offer them up to an external controller, which can serve as the host-based network hypervisor described above, and act as a point of presence on a computer network. Agents can be installed into multiple hosts on one or many networks, all of which will offer up their host's resources to the external controller for the creation of a single host abstraction layer (a.k.a., a host-based network hypervisor).

A first of the three programs within the host-agent is the "administrative service" and is installed in the user space of the host operating system. This program handles the command and control communications of its host that are oftentimes necessary to connect this local agent into a large network of agents. The external controller coordinates a category of agents as a lattice in order to deploy and control abstract entities as overlays onto a computer network. The other function of the administrative service is to manage the other two local agent programs.

It has been demonstrated that host-based programmable software agents can mimic realistic user and system behaviors while generating observable presence and traffic flows on physical, virtual or software defined networks. This process can be termed "behavior virtualization." Behavior virtualization can create entities termed abstract actors, abstract machines, abstract services and abstract network environments, which all may exist within actual computer networks.

The second program within the software agent described above can be termed the "abstract machine engine." The abstract machine engine is installed in the network stack within the host operating system (OS) kernel. The purpose of this program is to use the local host resources to build and associate any number of alias (or abstract) network interfaces to the actual (physical or otherwise) network interface. The number of abstract interfaces created by the abstract machine engine can be determined by the requirements of the administrative service layer in communication with the external controller. Each abstract interface has the ability to communicate with the switched network and establish a unique point of presence in the form of Media Access Control (MAC) addresses and Internet Protocol (IP) addresses.

The third and final program within the software agent described can be termed the "behavioral engine." It inserts logic into the user space of the host operating system alongside the administrative service and is responsible for managing models of behavior dynamically—either pre-determined or in real time—as defined by an external controller. These behaviors are designed for execution by a number (e.g., 1 to N) of unique entities, each with a paired mapping to the abstract interfaces that were created by the abstract machine engine as described above. The behavioral engine can ensure an association between actions being performed by an entity and the abstract interface (with a unique MAC and IP address) assigned to that entity, which creates the appearance of a unique user, machine or service on an operating network.

A combination of the creation of an abstract interface with a unique point of presence as described above, with the pre-programmed or dynamic real-time behaviors for 1 to N entities mapped to those interfaces as also outlined above, can be used to create virtualized behavior on almost any computer network in the following forms:

- Abstract/virtual users internal or external to the network (e.g. internal or remote employees, hostile hackers) with observable presence and real traffic generation on the network can be created. These can be termed "abstract actors."
- Systems or devices (e.g. network printers, email servers, web servers) that appear as real systems with observable processes and traffic on the actual network can be created. These can be termed "abstract machines."
- Network services either internal to the network (e.g. internal Dynamic Host Configuration Protocol (DHCP) services, searches on external search engines) that appear to be from the real source can be created. These can be termed "abstract services."

Technical advantages of embodiments are many.

In some embodiments, the above abstract actors, machines and services can work independently, inter-operate with any or all combinations of abstract actors, machines, and services, and/or operate with actual users, systems, tools and services on any combination of actual or abstract networks.

In other embodiments, virtualized behaviors as described above can be abstracted from actual networking equipment to allow abstract actors, machines, and services to perform on varied networking environments such as traditional hardware networking, public and private cloud environments, and software defined networks.

Virtual behaviors of abstract actors, machines, and services with unique and observable points of presence can generate real traffic over actual networking resources that can be monitored and tracked via readily-available network tools and management systems. These tools can be deliberately spoofed if appropriate or used by white/red/blue/black teams for visualization and training.

Evident in some embodiments is the ability to change the topology of a network through the creation of virtualized behaviors by entities with observable points of presence, each generating real, observable traffic as described in the claims above comes from a manipulation of host-based operating systems by agent programs inserted into one or several hosts on a network. They do not normally require changes to existing technology, processes, or procedures for network switching and routing equipment.

Software Defined Networking (SDN) typically separates out the switch/router functions of control from data processing to create a centralized software-based controller. In contrast, in some embodiments all manipulations of network topology and traffic come from agent control of the OS services provided in host systems on a network.

Dynamic, abstracted networks are created through manipulation of host systems, without changing any of the physical switching or routing fabric. There is no requirement to change a switch's or a router's internal operations. One can use the OpenFlow® standard (a trademark of the Open Networking Foundation), but it is not required.

Behavior virtualization can operate on legacy switching environments, virtual machine environments, private and public clouds, software defined networks, or any combination of the above.

The network stimulation engine allows for centralized management and more complete utilization of resources within a simulated network environment. This reduces both hardware and human resource requirements in comparison to current practices, such as using virtual machines. Since its hardware resources are lower, the network stimulation engine also allows for larger deployments to be made when compared to current practices. In addition, the network stimulation engine creates consistently realistic simulated network traffic, due to its centrally-managed behavioral algorithms.

FIG. 1 illustrates a behavioral engine and abstract machine engine in accordance with an embodiment. System 100 includes behavioral engine 101 and abstract machine engine 104.

In a simulated network environment, individual stimulation events can be known as actions. An action is typically some sort of network activity; however, it is not limited to network activities alone. Each action is performed by an actor 102.

Each actor 102 corresponds to a simulated device, such as a computer, printer, router, etc., on the network. After a user designs a model of behavior to simulate, model 108, behavioral engine 101, which is a statistical algorithm, determines how to stimulate the network by selecting which action needs to be performed based on user-made model 108.

Behavioral engine 101 generates a buffer of action decisions, action pool 103, for each actor. Algorithmic decisions made by the behavioral engine are added to the appropriate action pool. The algorithm determines which actor is required to act, what action will be performed, when the action needs to occur, and where the action will target in terms of a real network resource, if any external target is required for the action.

Next, abstract machine engine 104 stimulates the network environment based on action pools 103. For each actor 102 and its associated action pool 103, the abstract machine engine creates a simulated network interface 105, with an actor/action pool/simulated network interface correspondence that persists for the duration of a scenario. Interfaces 105 send and receive communication packets that are network activity 106, or network traffic, on the network.

To an observer on the network, each interface in the corresponding set appears as a single networked device with a unique MAC address and IP address. As the scenario progresses, each simulated network interface 105 created by the abstract machine engine performs actions from the action pools on behalf of its corresponding actor 102. Abstract machine engine 104 uses the simulated network interface corresponding with the actor for which the action is being performed and uses the appropriate plug-in, as designated in the model, to create the activity.

Two types of plug-ins are available to the abstract machine engine: simulator plug-in 109 that performs activities to a designated degree of completeness, and caller plug-in 110 that calls out to an external piece of software to perform whatever activities for which the software is ordinarily used. The abstract machine engine points simulator plug-in 109 or caller plug-in 110 to the appropriate target, if any.

In the exemplary embodiment, one of two action frequency methods are used to drive the performance of the actions. In the first method, each action pool is polled at a given frequency for actions which need to be performed at the current tick. The second method involves each action pool being associated with a synchronized clock mechanism. Any actions that need to be performed at the current tick are pushed up to the abstract machine engine.

Figure 2A:
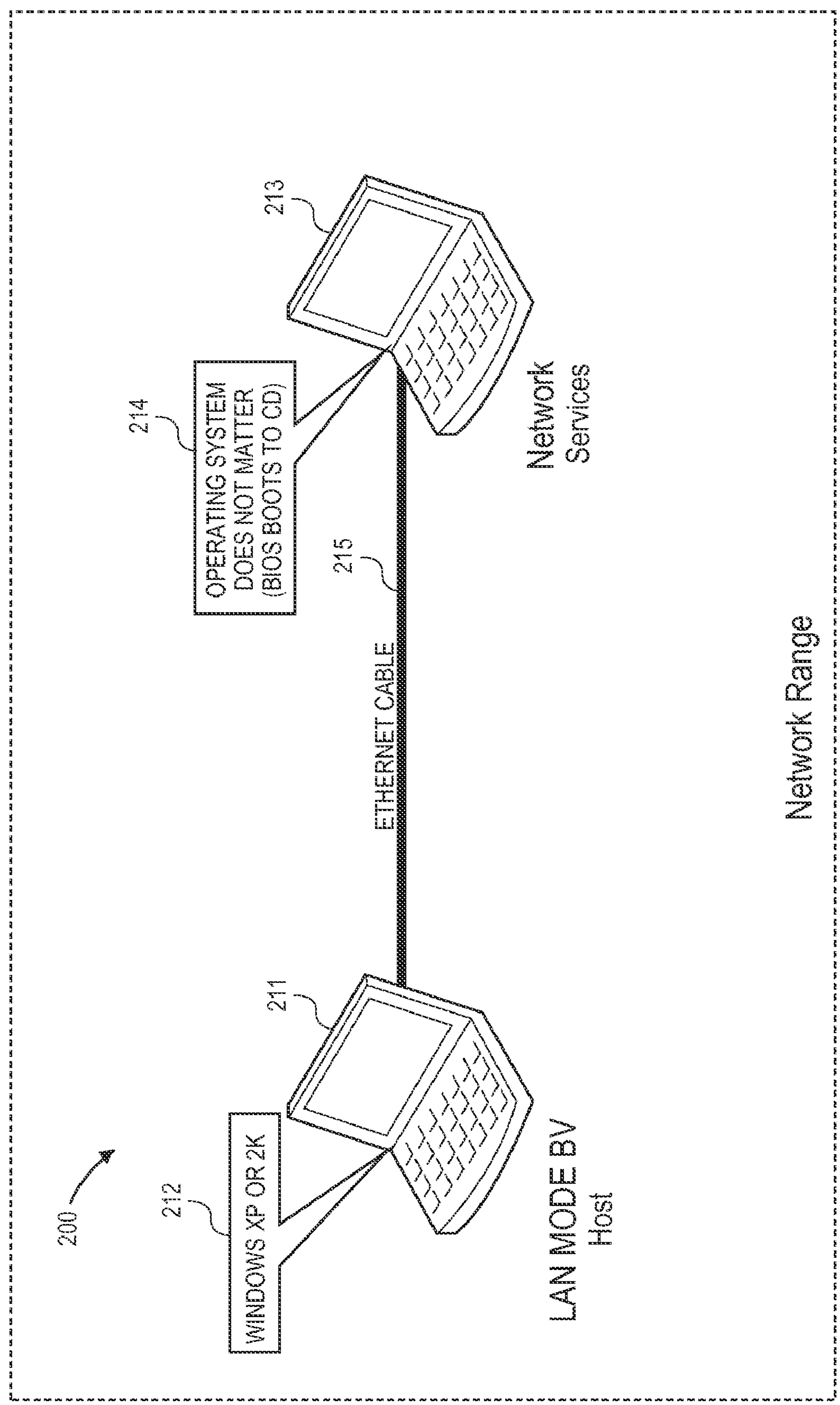
FIG. 2A illustrates a simple network range in accordance with an embodiment.
Figure 2B:
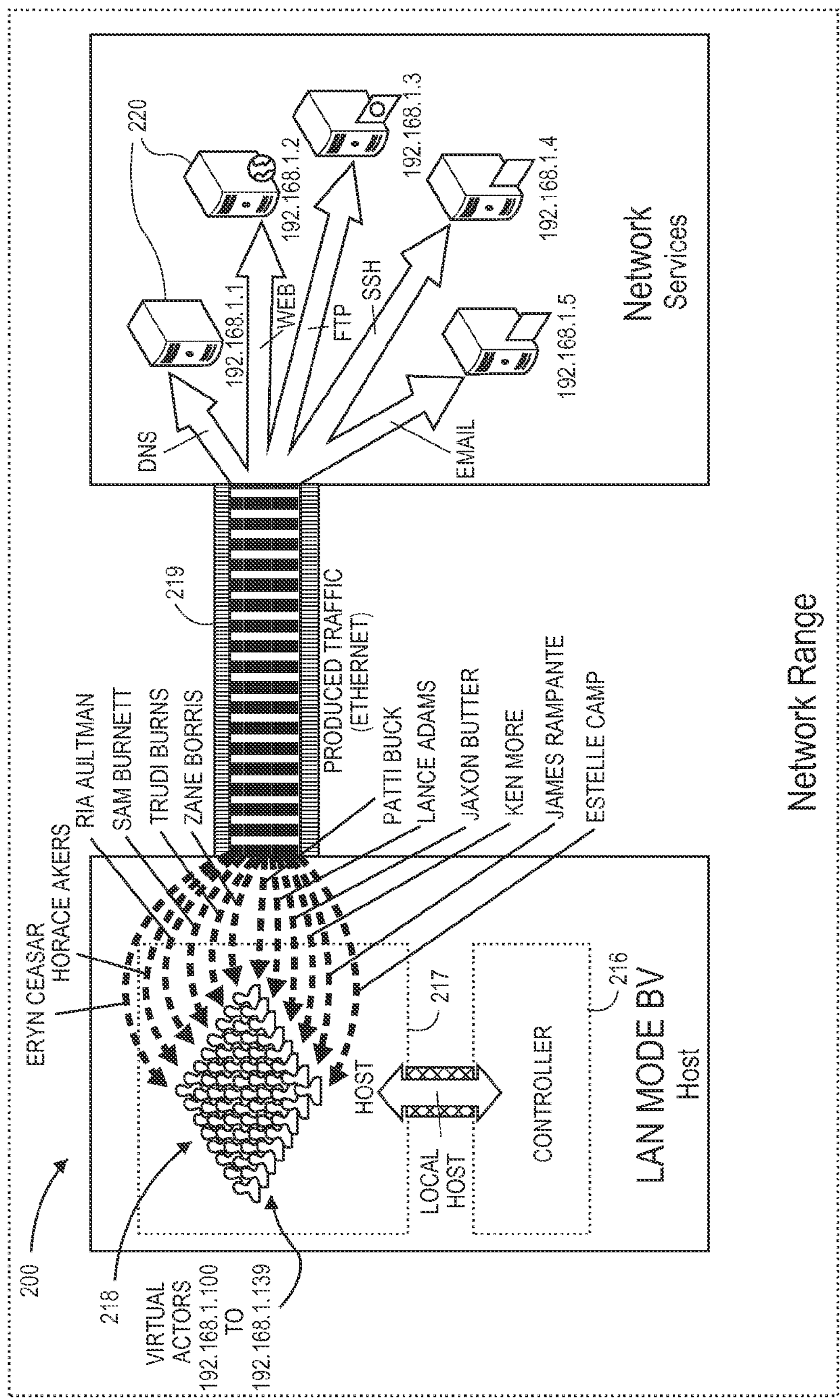
FIG. 2B illustrates virtual actors and network equipment in the network range of FIG. 2A.

FIGS. 2A-2B illustrate a simple computer network range in accordance with an embodiment. In computer network range 200, host computer 211 runs operating system 212, which is Microsoft Windows XP® or Microsoft Windows 2000®. Local Area Network (LAN) mode behavior virtualization host computer 211 is connected via Ethernet cable 215 to network services computer 213. Network services computer 213 runs operating system 214, which may be the same or different from operating system 212.

In some embodiments the behavioral engine and abstract machine engine are functions that are important to pull together actual host resources into a type of network hypervisor. The host resources can include local compute resources, storage resources, and network resources.

The controller can use the host network stack to look out to the greater actual network. An agent can have a point of presence on the network from which it can project the abstract machines into a machine mesh. The projections create a mesh of abstract machines that can be seen on the network. Multiple agents on various hosts can be connected into a lattice. The lattice is the aggregation of resources to start creating abstract network environments.

FIG. 2B illustrates virtual actors and simulated networked equipment running on the physical computers of FIG. 2A. LAN mode behavior virtualization host computer 211 executes LAN mode behavior virtualization (BV) controller 216 and LAN mode behavior virtualization host 217. They communicate by a local host connection. LAN mode behavior virtualization controller 216 commands LAN mode behavior virtualization host 217 to create virtual actors 218. Virtual actors 218 imitate real humans in their online activity. The behaviors are created by using a statistical behavioral model, such as that described in FIG. 1 (i.e., model 108).

Network services computer 213 executes network services 220 in the form of a Domain Name System (DNS) server, web server, File Transfer Protocol (FTP) server, Secure Shell (SSH) server, and Email server.

Actors 218 communicate with network services 220, producing network traffic 219 between them on Ethernet cable 215. In the exemplary embodiment, forty virtual actors communicate with five virtual network services, emulating a substantial network. This network can be scaled up (or down) depending on how much network traffic is necessary for a simulation. Note that only two physical computers are used in this simulation.

Figure 3:
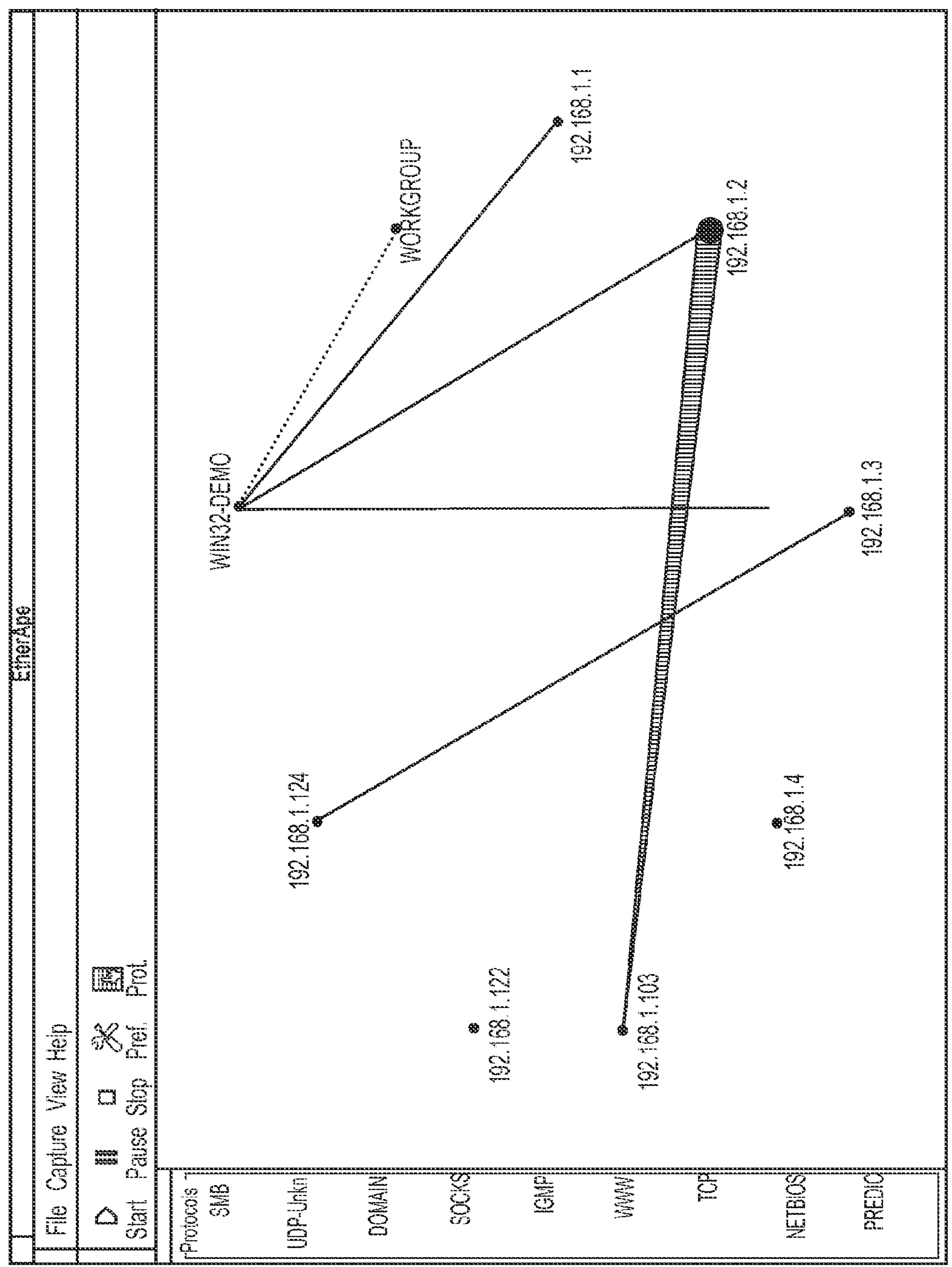
FIG. 3 illustrates a graphical network monitor view of a computer network in accordance with an embodiment.

FIG. 3 illustrates a graphical network monitor view of a computer network in accordance with an embodiment. In screen shot 300, various IP addresses representing computers are shown in a ring, and network traffic between them is shown as lines between the computers. The lines come and go in real-time as traffic comes and goes. The larger the circle around a node, the more traffic is coming or going from that location. Colors are often used to depict the type of traffic sent. For example, email traffic can be shown in yellow, and video traffic can be shown in red.

As nodes are added or subtracted from the network, their corresponding IP addresses appear or disappear from the screen. A hacker viewing the simulated network in FIGS. 2A-2B with the network mapping tool graphical user interface (GUI) of FIG. 3 sees an active network which is difficult, if not impossible to distinguish from a real network.

Figure 4A:
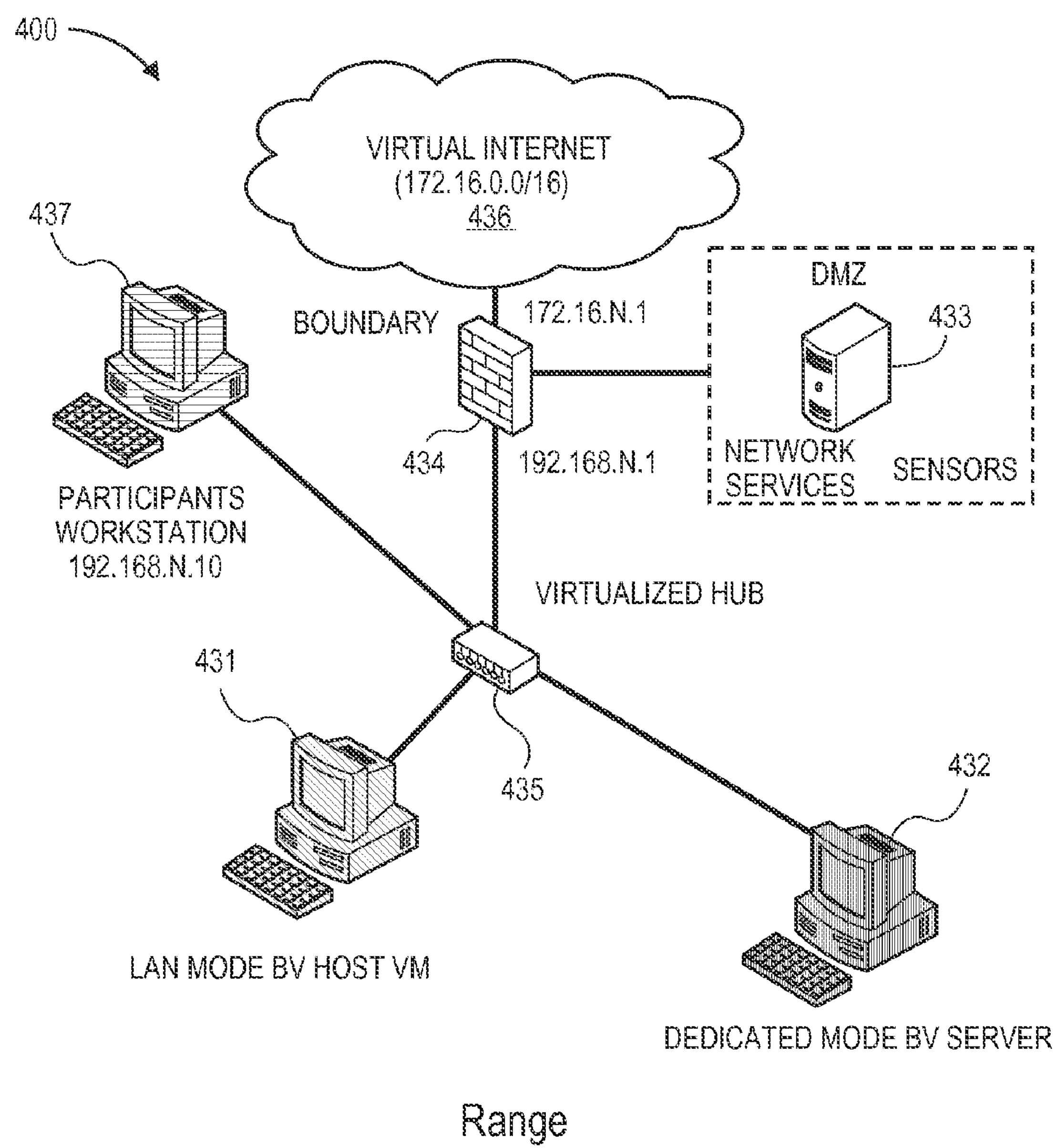
FIG. 4A illustrates a participant in a test network in accordance with an embodiment.
Figure 4B:
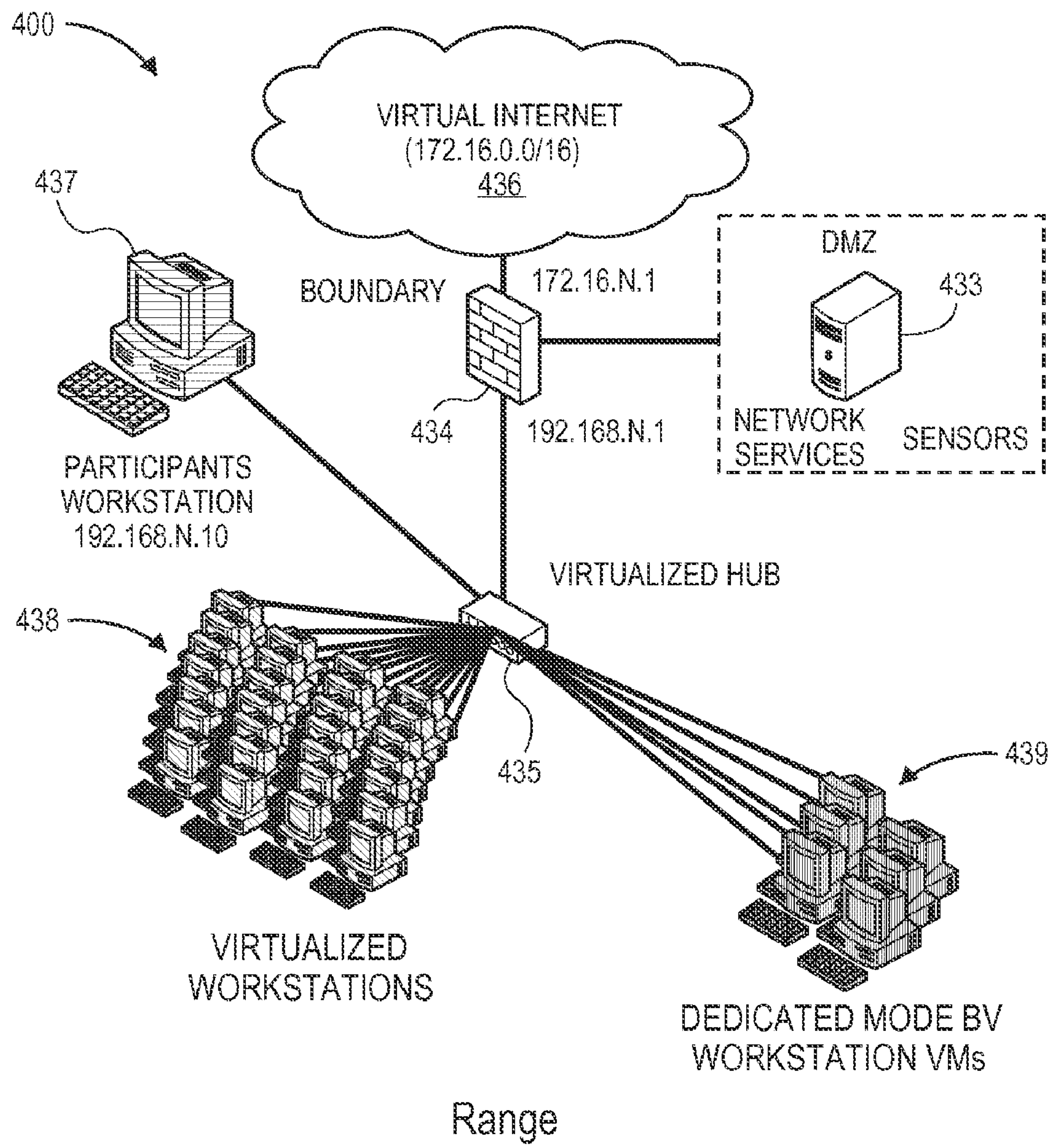
FIG. 4B illustrates virtualized workstations of the network in FIG. 4A.
Figure 4C:
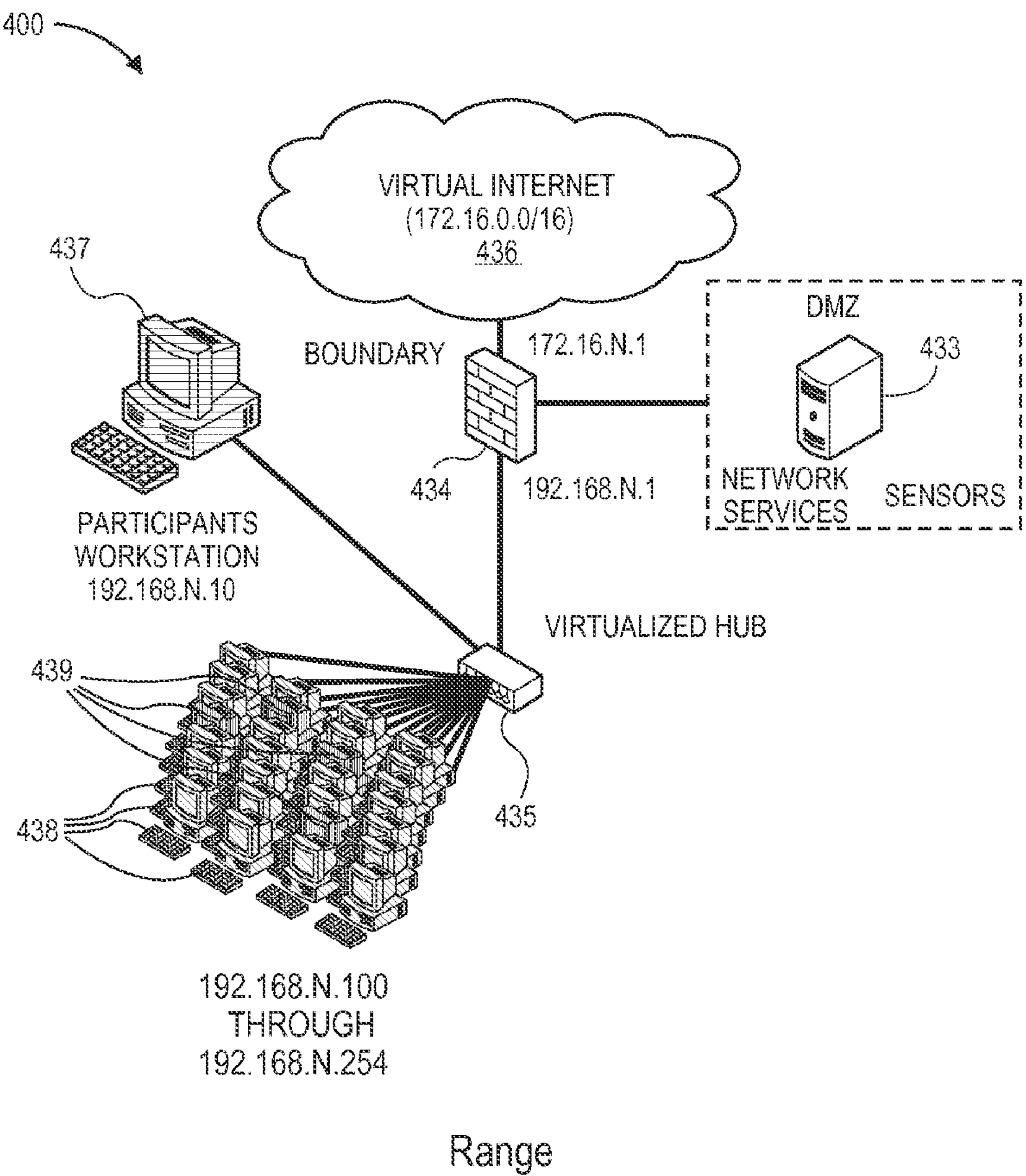
FIG. 4C illustrates hiding workstations within the network of FIG. 4B.

FIGS. 4A-4C illustrate a participant in a test network in accordance with an embodiment. A network range includes LAN Mode Behavioral Virtualization host VM (Virtual Machine) 431, dedicated mode behavioral virtualization server 432, De-Militarized Zone (DMZ) network services and sensors 433, boundary 434, virtualized hub 435, virtual internet 436, and participant workstation 437.

A user, such as a network administrator undergoing a defense-of-network test, uses participant workstation 437 to access the network through virtualized hub 435. Other computers, which may or may not be virtual machines, are accessed through the hub. LAN Mode Behavioral Virtualization host VM 431 can be a single computer, a virtual machine spread across several computers, or a virtual machine partitioned from other virtual machines running on a single computer. dedicated mode behavioral virtualization server 432 can be similarly implemented. Boundary 434 can be a firewall or other boundary. DMZ 433 is located 'outside' the boundary without the boundary's protection from virtual internet 436.

As shown in FIG. 4B, a LAN Mode Behavioral Virtualization controller commands a LAN Mode Behavioral Virtualization host to create a specified number of virtualized workstations 438, each virtualized workstation 438 having a virtual network interface corresponding to an actor. These actors can emulate human-operated devices or automatic networked equipment, for example.

Dedicated mode behavioral virtualization server 432 is commanded to create a specified number of dedicated mode behavioral virtualization workstation VMs 439, each dedicated mode behavioral virtualization workstation VM having a virtual network interface. The dedicated mode behavioral virtualization workstation VMs can be operated by actual, human users, during the test for example.

A user at participant workstation 437 using a packet sniffer/network mapper sees network traffic between virtualized workstations 438 and dedicated mode behavioral virtualization workstation VMs 439. The traffic persists as the scenario goes on.

FIG. 4C shows dedicated mode behavioral virtualization workstation VMs 439 being hidden within virtualized workstations 438 by, among other things, randomly intermixing their IP addresses. Because of the realistic network traffic from stochastic actors going to and from virtualized workstations 438, it is difficult for a participant to distinguish those workstations from dedicated mode behavioral virtualization workstation VMs 439.

The inventors have found that this configuration can be an effective way to train operators using less labor and hardware than would be needed to set up an entire physical computer network. A large or small number of computers can be emulated, depending on the training needs. For example, during a cyber attack simulation, a blue team sees an apparent network that can train them in tools, tactics, and procedures.

Furthermore, the inventors have found that the hiding of real, physical workstations within a sea of virtualized workstations can make it difficult for a hacker to effectively acquire real data from, effect the operation of, or otherwise hack a network. This can be useful in corporate, government, and other organizations' networks.

In some embodiments, the virtualized workstations and a software defined network upon which they operate can be rapidly altered to protect against hacker mapping tools and network attacks. Akin to frequency hopping in radio frequency (RF), software-defined network 'hopping' can make it difficult for outsiders to map or jam a network. A software defined network can hop to a different configuration at set time intervals, automatically in response to certain network events, or randomly.

In some embodiments that are useful for training, testing, and/or network security, autonomous software agents, sometimes referred to as "sensors," can detect and observe process-to-process activities across host systems from the perspective of the network. They can then react to these observations by creating abstract network environments within physical, virtual, and software defined networks or modify the structure of networks.

Once host systems have been leveraged to change the actual network topology and control switching fabric to create behavior virtualization and abstract network environments, it is then possible to alter the topology and behavior of a network locally and globally based on local conditions or observations.

Agents/sensors can be installed and reside within the network stack or other appropriate layers of the host operating system. Each sensor observes process activity within its host to deduce ongoing processes in order to process related communications with the host out to other systems/services in the network.

Agents/sensors can communicate via relays placed throughout the physical network back to a central management server platform. Sensors may be capable of independently analyzing the data outlined above or rely on programs within the relays and management server to assist in processing and interpreting activity data and/or provide summary information to administrators for analysis.

Sensors can automatically or by administrative instruction alter networking topology of the actual network, including dynamically creating an abstract network environment within the installed host and/or several hosts with similar agents/sensors that can then mimic all or part of the physical, virtual or software defined network in which the host resides. It can also include restricting actual network packet/data flow from certain processes and programs to that abstract network environment without revealing to the process that it is no longer operating within the actual original target network. This can be to isolate a process or program in a fictional but realistic abstract network environment while allowing the process or program to continue executing under the impression that it is in a real network environment. Such activity could allow for efficient methods of testing applications and processes on a simulated, scaled network without the requirement to install or engage full network resources. It can help train users on applications or processes at a network scale and realism without the requirement to install or engage full network resources.

It can also provide network security against targeted attacks by isolating and observing suspect processes in a contained environment without terminating said suspect process or revealing to the suspect process that it is not still operating in an actual network, so that the suspect process could be observed to reveal its true intent without putting critical systems and processes at risk.

For example, false apparent views can be stored in a configuration file and read as needed. The false apparent views of the network configuration are different from the actual network configuration. A hacker may use a network mapping tool to identify a quantity of nodes, their IP addresses, and other information in the network. However, intrusion detection software can determine that the hacker is outside of the network or in a different country than a company's headquarters. A selection between several false views can be made based on an identification of the mapping tool or the geographic area of the intruder. A response to the request can be based on the apparent views, the response containing false IP addresses and other misinformation to obfuscate the hacker. The response can be sent to the network mapping tool in conjunction with other responses in order to confuse and deflect the hacker. In addition, randomized, dynamic DMZ overlay meshes can be deployed to obfuscate the hacker.

In some embodiments, two separate hosts have their own software agents and meshes. These can be two virtual machines in the same physical hosts that could be connected to completely different local area networks (LANs). Each of these LANs can be in the same "location" or look to be in a different "location." If two VMs have two software agents in the same point of presence (i.e., the same "location"), their abstract machines can be interwoven at the various abstract layers. It has been demonstrated that one can create a network without requiring any switching. The network can be "switched" but does not require an actual, physical switch.

The controller's responsibility can be to co-ordinate host resources (compute, storage—data from local file systems, SAN etc., network) in order to create an abstract network environment. The controller initiates asynchronous communications with the host to determine what resources are available to create an abstract network environment and perform the functions of the above-described behavioral engine and abstract machine engine.

In some embodiments, the controller first communicates with the storage services within the host to collect data on the stored machine images (stored as files) and the description languages (e.g., how those machines should be networked together). It can then uses Libvirt to talk to KVM (Kernel-based Virtual Machine), or another hypervisor application, that is in the host to command it to provision the abstract machines into a machine mesh. Finally the controller communicates with the networking stack in the host and out to other hosts in the network in order create a network mesh across all hosts. In other words, the controller creates a networking environment in order to allow the mesh of abstract machines, actors, and services to communicate. This can be termed an abstract network environment, ready to receive instructions from the behavior engine on how to perform. One can provision as many abstract network environments as needed provided the resources are available to create them. It has been demonstrated that a single laptop can create half a dozen abstract machines in a network. A server blade could represent a medium-sized business network, and a rack of servers could create a full enterprise abstract network environment.

Figure 5:
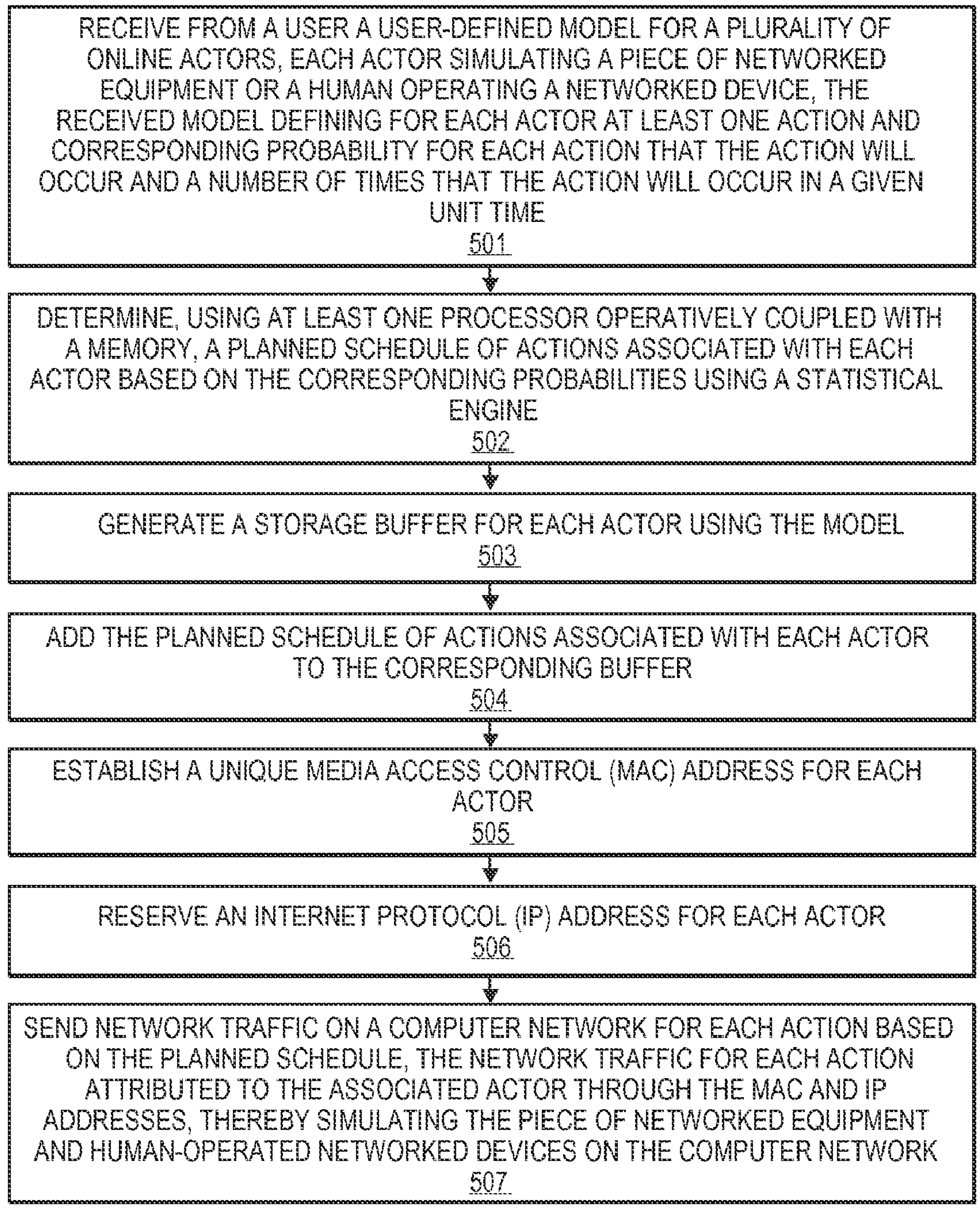
FIG. 5 is a flowchart of a process in accordance with an embodiment.

FIG. 5 is a flowchart of a process in accordance with an embodiment. In operation 501, a user-defined model for a plurality of online actors is received from a user, each actor simulating a piece of networked equipment or a human operating a networked device, the received model defining for each actor at least one action and corresponding probability for each action that the action will occur and a number of times that the action will occur in a given unit time. In operation 502, a planned schedule of actions associated with each actor is determined based on the corresponding probabilities using a statistical engine. In operation 503, a storage buffer for each actor is generated using the model. In operation 504, the planned schedule of actions associated with each actor is added to the corresponding buffer. In operation 505, a unique media access control (MAC) address is established for each actor. In operation 506, an Internet protocol (IP) address is reserved for each actor. In operation 507, network traffic is sent on a computer network for each action based on the planned schedule, the network traffic for each action attributed to the associated actor through the MAC and IP addresses, thereby simulating the pieces of networked equipment and human-operated networked devices on the computer network.

Figure 6:
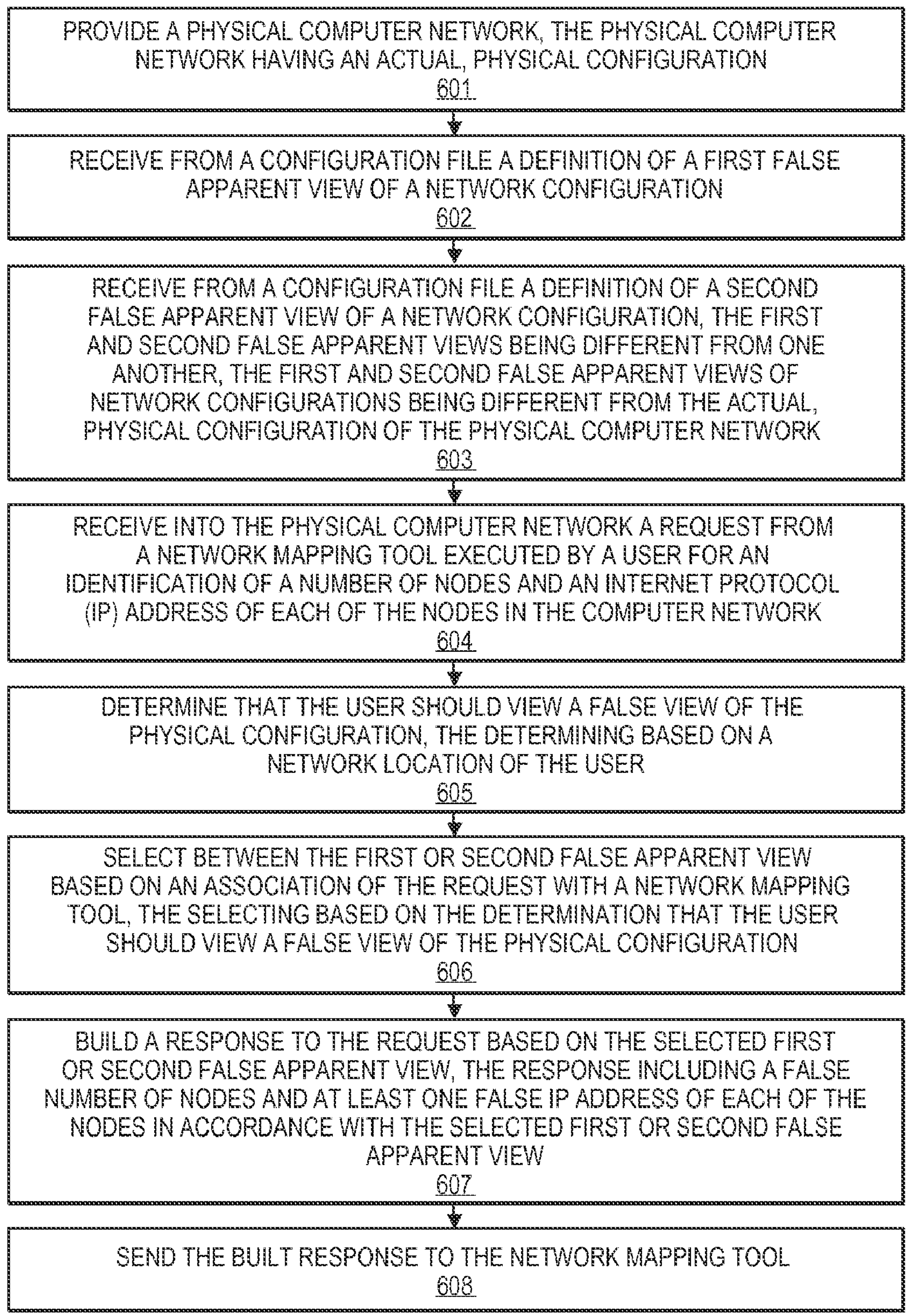
FIG. 6 is a flowchart of a process in accordance with an embodiment.

FIG. 6 is a flowchart of a process in accordance with an embodiment. In operation 601, a physical computer network is provided, the physical computer network having an actual, physical configuration. In operation 602, a definition of a first false apparent view of a network configuration is received from a configuration file. In operation 603, a definition of a second false apparent view of a network configuration is received from the configuration file, the first and second false apparent views being different from one another, the first and second false apparent views of network configurations being different from the actual, physical configuration of the physical computer network. In operation 604, a request is received into the physical computer network from a network mapping tool executed by a user for an identification of a number of nodes and an internet protocol (IP) address of each of the nodes in the computer network. In operation 605, it is determined that the user should view a false view of the physical configuration, the determining based on a network location of the requesting user. In operation 606, a selection is made between the first or second false apparent view based on an association of the request with a network mapping tool, the selecting based on the determination that the user should view a false view of the physical configuration. In operation 607, a response to the request is built based on the selected first or second false apparent view, the response including a false number of nodes and at least one false IP address of each of the nodes in accordance with the selected first or second false apparent view. In operation 608, the built response to the network mapping tool is sent through the network.

The operations may be performed in the sequence given above or in different orders as applicable. They can be automated in a computer or other machine and can be coded in software, firmware, or hard coded as machine-readable instructions and run through one or more processors that can implement the instructions.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details.

For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of simulating a computer network, the method comprising:

receiving from a user a user-defined model for a plurality of online actors, each actor simulating a piece of networked equipment or a human operating a networked device, the received model defining for each actor at least one action and corresponding probability for each action that the action will occur and a number of times that the action will occur in a given unit time;

determining, using at least one processor operatively coupled with a memory, a planned schedule of actions associated with each actor based on the corresponding probabilities using a statistical engine;

establishing a unique media access control (MAC) address for each actor;

reserving an Internet protocol (IP) address for each actor; and sending network traffic on a computer network for each action based on the planned schedule, the network traffic for each action attributed to the associated actor through the MAC and IP addresses, thereby simulating the pieces of networked equipment and human-operated networked devices on the computer network.

2. The method of claim 1 further comprising:

generating a storage buffer for each actor using the model; and adding the planned schedule of actions associated with each actor to the corresponding buffer.

3. The method of claim 2 further comprising:

pulling from the buffers each action at a predetermined frequency.

4. The method of claim 2 further comprising:

associating each buffer with a software clock; and pushing each action from the buffers at a predetermined frequency according to the associated software clock.

5. The method of claim 1 wherein the MAC and IP addresses are associated with a virtual network card.

6. The method of claim 1 further comprising:

receiving a request from a network mapping tool for an address of an actor; and responding to the request with a packet including the IP addresses of the requested actor.

7. The method of claim 6 wherein the request is received from outside the computer network.

8. The method of claim 1 further comprising:

ascertaining a real network resource that an action will target;

adding the ascertained resource to the determined planned schedule; and pointing a plug-in to the ascertained resource.

9. The method of claim 1 wherein the receiving and determining are through a behavioral engine application and the sending is through a plug-in that calls software that is external to the application and plug-in.

10. The method of claim 1 wherein the sending of network traffic is persistent for each actor and continues until stopped by a user.

11. The method of claim 1 wherein the simulated networked equipment is selected from the group consisting of a web server, a print server, a storage server, and a printer.

12. The method of claim 1 wherein the simulated networked device operated by the human includes a desktop, notebook, netbook, or tablet personal computer (PC), workstation, personal digital assistant (PDA), voice over Internet protocol (VoIP) telephone, network appliance, and smart phone.

13. The method of claim 1 wherein the operations are performed in the order shown.

14. The method of claim 1 wherein each operation is performed by the at least one processor operatively coupled with the memory.

15. A non-transitory machine-readable storage medium embodying information indicative of instructions for causing one or more machines to perform the operations of:

receiving from a user a user-defined model for a plurality of online actors, each actor simulating a piece of networked equipment or a human operating a networked device, the received model defining for each actor at least one action and corresponding probability for each action that the action will occur and a number of times that the action will occur in a given unit time;

determining, using at least one processor operatively coupled with a memory, a planned schedule of actions associated with each actor based on the corresponding probabilities using a statistical engine;

establishing a unique media access control MAC address for each actor;

reserving an Internet protocol (JP) address for each actor; and sending network traffic on a computer network for each action based on the planned schedule, the network traffic for each action attributed to the associated actor through the MAC and IP addresses, thereby simulating the pieces of networked equipment and human-operated networked devices on the computer network.

16. The non-transitory machine-readable storage medium of claim 15 further comprising instructions for causing one or more machines to perform the operations of:

generating a storage buffer for each actor using the model; and adding the planned schedule of actions associated with each actor to the corresponding buffer.

17. The non-transitory machine-readable storage medium of claim 16 further comprising instructions for causing one or more machines to perform the operations of:

pulling from the buffers each action at a predetermined frequency.

18. A computer system comprising:

a processor, which is configured to execute instructions in a computer program, the computer program instructions comprising program code for performing the operations of:

receiving from a user a user-defined model for a plurality of online actors, each actor simulating a piece of networked equipment or a human operating a networked device, the received model defining for each actor at least one action and corresponding probability for each action that the action will occur and a number of times that the action will occur in a uiven unit time;

determining using at least one processor operatively coupled with a memory, a planned schedule of actions associated with each actor based on the corresponding probabilities using a statistical engine;

establishing a unique media access control (MAC) address for each actor;

reserving an Internet protocol (IP) address for each actor; and sending work traffic on a computer network for each action based on planned schedule, the network traffic for each action attributed to the associated actor through the MAC and IP addresses, thereby simulating the pieces of networked equipment and human-operated networked devices on the computer network.

19. The computer system of claim 18, the computer program instructions further comprising program code for performing the operations of:

generating a storage buffer for each actor using the model; and adding the planned schedule of actions associated with each actor to the corresponding buffer.

20. The computer system of claim 19, the computer program instructions further comprising program code for performing the operations of:

pulling from the buffers each action at a predetermined frequency.

* * * * *